United States Patent [19]

Bristol

[11] Patent Number: 4,669,097
[45] Date of Patent: May 26, 1987

[54] DATA COMPRESSION FOR DISPLAY AND STORAGE

[75] Inventor: Edgar H. Bristol, Foxboro, Mass.

[73] Assignee: The Foxboro Company, Foxboro, Mass.

[21] Appl. No.: 789,531

[22] Filed: Oct. 21, 1985

[51] Int. Cl.⁴ ............................................. H03K 5/00
[52] U.S. Cl. ..................................... 375/122; 382/56; 381/31
[58] Field of Search ................ 375/122; 358/133, 135, 358/138, 260; 340/347 DD, 723, 798, 799; 370/118; 381/29, 31; 382/56; 364/164, 515

[56] References Cited

U.S. PATENT DOCUMENTS 3,527,885  9/1970  Bussgang .......................... 358/133
4,368,462  1/1983  Crawley ............................. 382/56
4,513,444  4/1985  Okai et al. .......................... 382/56

OTHER PUBLICATIONS

IEEE Proceedings, vol. 55, No. 3, 1967, pp. 278-279.
Chemical Engineering Progress, Nov. 1981, pp. 38-43.
IEEE Spectrum, Mar. 1967, pp. 113-139.
Data Compression Techniques and Applications; Lynch; Lifetime Learning Publications; Belmont, Calif., pp. 118, 119, 126-128, 142-144, 210-212.

Primary Examiner—Benedict V. Safourek
Attorney, Agent, or Firm—William E. Meyer; Jack H. Wu; Terrence Martin

[57] ABSTRACT

The Swinging Door Method of compressing an industrial process data stream is described. Data used for generating a line graph is compressed for display or storage while preserving maximum, and minimum values, and other valuable data features. The method establishes offsets from a first point which then defines a corridor opening. Subsequent points are received to refine the defined error band or corridor direction until a point is received that cannot be included in the corridor. An end point for the corridor is then generated. The corridor end points then replace the intervening raw data as the output.

24 Claims, 4 Drawing Figures

DATA COMPRESSION FOR DISPLAY AND STORAGE

BACKGROUND OF THE INVENTION

1. Technical Field:

This invention relates to methods of presenting and storing data, and in particular methods of compressing data. More particularly the invention is concerned with methods for compressing a data stream for display or storage.

2. Background Art:

Modern process control is becoming increasingly computerized, and part of this development is the addition of electronic intelligence to process components. Valves, sensors, controllers and similar devices are broadcasting information back to the electronic controllers which at times are inundated with information. Only portions of this information are relevant to plant operation. Other information is either noise, or redundant.

Storing data is an important part of the computerization process. Data may be stored locally at the generating source, at intermediate gathering or processing nodes, at central computers, and at archival units. In any case, storing every data point in a stream that is highly repetitive, or has a high noise component soon exhausts the storage available and may fail to preserve significant subsequent data. It is simply not economical to store noisy or repetitive information when trends or crucial points will suffice.

Commercial examples of these problems occur in the process control industry where plants commonly run continuously. The fluctuating record of a sensor unit, such as a thermometer, a pressure gauge or liquid level monitor, or an output unit such as a valve, or heater, may be studied for process improvements, or used for process operation. Such study or operation may require several hours, or days worth of data and there may be a multitude of controllers in a large process plant. Furthermore, records may be required for quality control, legal, repair or other purposes. Recording all data would soon exhaust the local storage linked to the unit generating the data stream. The need to compress data conveniently and yet accurately is evident.

There are a variety of prior methods of resolving these difficulties, each of which has unsatisfactory aspects. A general understanding of relevant features present in a two dimensional (value and time) data stream is useful. The attributes of a graph that are usually of interest, are the current trend, the maximum and minimum points, maximum and minimum slopes, maximum and minimum variations from some average, integral values, and of course the actual data points. It may also be important to know the amount of noise at a particular time.

Averaging is a method of reducing the data rate or data volume problem. In the most common method of averaging a group of sequential values is combined and reduced to one average point. This is actually a filtering. Averaging loses the maximums and minimums listed above and creates a new but false substitute point. Noise is eliminated, as is the information about the amount of noise.

Another method to filter data is to keep only points that differ by a minimal amount from the last stored point. This method still tends to store noise where there are frequent changes. Still another method to filter data is to eliminate "deviant points", those that are not smoothly in line with others, but this method eliminates real spikes along with any noise. Filtering generally destroys the maximums mentioned above, but the remaining points are all true points. As many points as necessary may be eliminated, but with an equivalent loss of truth to the presentation.

Data compression is a method distinct from averaging or filtering. Data compression analyzes the signal of the data stream to abstract the critical aspects from the process data and store them in memory in a format requiring less memory, than if every point of the original data were stored. Ideally this abstraction results in the more important points being kept while fewer points overall are stored. The abstraction should benefit the user by allowing a clearer display, uncluttered by noise. The process should aid interpretation by preserving significant aspects of the data, and showing clear trends.

Most data compression methods known in the art pertain to communications signal processing or to television displays which are not of concern here. Video compression generally links the data of successive screen sweeps and generates a reduction or enhancement of them. Another form of data compression relates to reducing character strings which again is a different problem. Here the concern is with a single line graph as for example one representing the flow in a supply line over time.

A known compression method as shown by Historical Data Recording for Process Computers, by John Hale and Harold Sellars, in *Chemical Engineering Progress*, Nov. 1981, pp. 38–43, establishes an envelope about the data and generates a trend line for a series of points. The trend line is used to represent all points in the envelope until the trend changes. More particularly, the first two points are used to generate an extrapolated trend line. As each successive point is received its vertical position is compared with that of the trend line. If the difference is less than a fixed amount, the point is held one cycle as a next to last point, and then dropped if the next point is also within the trend line zone. If the difference exceeds the fixed amount, then the first point and the next to last point are saved as corridor end points; and the next to last and last points are used to determine the next trend line. The method is highly sensitive to the peculiarities of the slope between the first two points of a corridor section. The sensitivity is not mediated by successive points all of which may be on a valid trend line. As a result, the Hale and Sellars method establishes weak and arbitrary trend lines, that require the storage of more points than necessary.

An additional problem is the dynamic adaption of the analytic method to the changing states of the memory and the input stream. With a fixed analysis above, a dynamic period in the input signal may exhaust memory before the stored data is processed and the memory released for subsequent use. Data is lost as a result. Equally, a static period may exhaust memory with redundant information, resulting in less complete recording during dynamic periods.

A further problem is that known regularities or patterns may exist in the input data. A staircase function is an example of such a pattern. Recognizing such patterns allows greater compression of the data as a few key aspects may be kept to represent several points. Each point may signal the start of the pattern, and yet each point may be offset slightly from the ideal location, as a result each point stimulates complex testing. Seeking complex patterns in raw data is then necessarily difficult and inefficient.

Therefore, there exists a need for a device and a method that resolves the above listed deficiencies while reducing the data stream at least as much as other known methods. More particularly, the device and method need to preserve the valuable aspects of the data stream of an input signal while reducing the stream more than the above methods.

The device and method need to make core storage available for active trend storage without arbitrary constraints on the time span for active storage, and without the loss of major trend features by the compression strategy.

The device and method need to represent the trend both in terms of a trended value and in terms of a static or dynamic error envelope imposed by the compression strategy operating on successive points.

The device and method need to further abstract the data to effectively use the display device when the recording time scale and display time scale are radically different.

The device and method need to be capable of multiply recompressing data for archival storage.

The device and method need to adjust the compression rate according to memory available to preserve trending in the event there is a failure of archival storage or communication links until the failure is overcome.

The device and method need to be includable in a single loop controller or other minimal memory devices having only simple storage and communication ability.

The device and method need to allow the display of trends with predictive projections which are based on the compression strategy.

SUMMARY OF THE INVENITON

The invention comprises a data compression device having a data input channel, a series of logic and memory units for computing a series of segment end points corresponding to trend line representations of the data stream, data output means for communicating with display or memory devices. The included method reduces an input data stream to an output series of segment end points corresponding to dynamically determined trend lines representing the data stream.

More particularly, the method establishes offsets from a first point which then define a corridor between an upper and lower boundary. Subsequent points are received to dynamically define by progressive refinement the final corridor direction. The boundaries are adjusted to admit successive points until a point is received that cannot be included in the dynamically defined corridor. An end point for the corridor is then generated. The two corridor end points then replace the multiplicity of intervening raw data values as the compressed data of the output signal.

DETAILED DESCRIPTION OF THE PREFERRED EMBODIMENT

It is useful to first establish an operating device and environment for the more complex method discussed below. Accordingly, process control equipment and the data compression components for use with the method discussed below are displayed in FIG. 1 at 10 generally. A pressure sensor, flow meter or similar signal source 12 generates an analog signal, typically of from 4 to 20 milliamps. The signal passes along line 14 to an analog filter 16 where basic noise is removed. The filtered analog signal is passed by line 18 to an analog to digital converter 20. The digital signal is then supplied by line 22 to a digital signal filter 24 where digital chatter is removed. The analog and digital filters are not required but are typical of the process.

Figure 1:
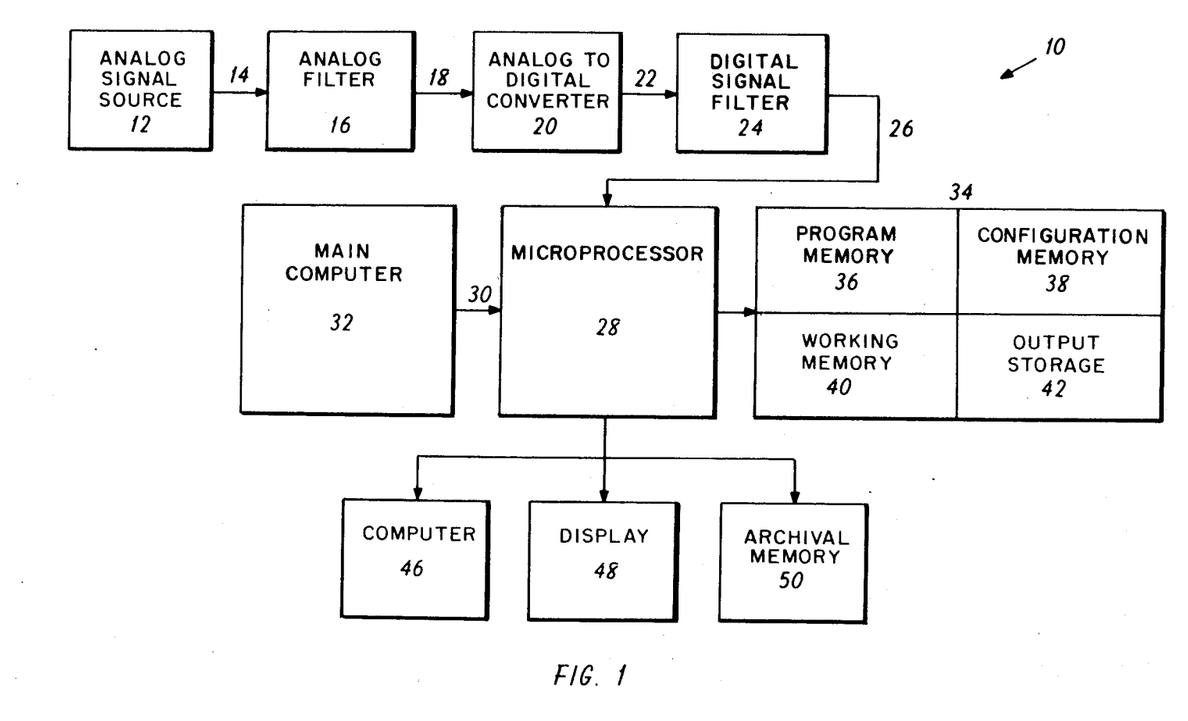
FIG. 1 is a block diagram of a preferred embodiment of the electronics.

The filtered digital signal is passed by line 26 to a microprocessor 28. Similarly other data sources provide signals that are filtered and converted to the same microprocessor 28.

The digital signal received along line 26 by the microprocessor 28 comprises a series of digital bits that are grouped to represent the digital values of the original analog signal. The digital signal may or may not include time values. Typically, the digital values have a fixed time spacing that corresponds to the running rate of the analog to digital converter 20. The microprocessor 28 or other circuitry may then insert appropriate time values.

The microprocessor 28 further receives control signals as inputs along a line 30 from an operator, or as depicted, by a main computer 32 to initialize, start, stop, and otherwise signal the overall operation of the microprocessor 28.

The microprocessor 28 is linked to a local memory 34. The local memory 34 may be integral with the microprocessor's operations memory or separate. The memory 34 is depicted as being separate from the microprocessor 28. The microprocessor 28 communicates with local memory 34 for storage and retrieval of (1) the digital input data values received from 26, (2) the main computer control inputs received from line 30, and (3) calculated and temporarily retained results.

Memory 34 may be conveniently divided into: a program memory 36, a configuration memory 38, a working data memory 40 and an output storage 42. The program memory 36 which in one form is read only memory (ROM) includes all the processing steps (1,000 words or more) necessary to carry out the process to be described. The configuration memory 38 includes words identifying each data stream being processed with for example, name, engineering units, scaling, or similar aspects. The configuration memory 38 may also include 5 to 10 parameter words defining any prefiltering of the data stream. The working data memory 40 may contain a section of the incoming data to be compressed. The output storage 42 contains the generated compressed data prior to output.

Microprocessor 28 compresses the received input stream and either stores the result in memory 34 until directed to pass the compressed data on, or microprocessor 28 issues the compressed output stream by a line 44 to another computer 46, a display device 48, or an archival memory 50.

The output signal as will be discussed below may consist solely of the end points of trend line segments that fit the incoming data; or the output data may include additional codings and data items that identify the data stream, and indicate additional aspects of the compression parameters used in reducing the incoming data.

Figure 2:
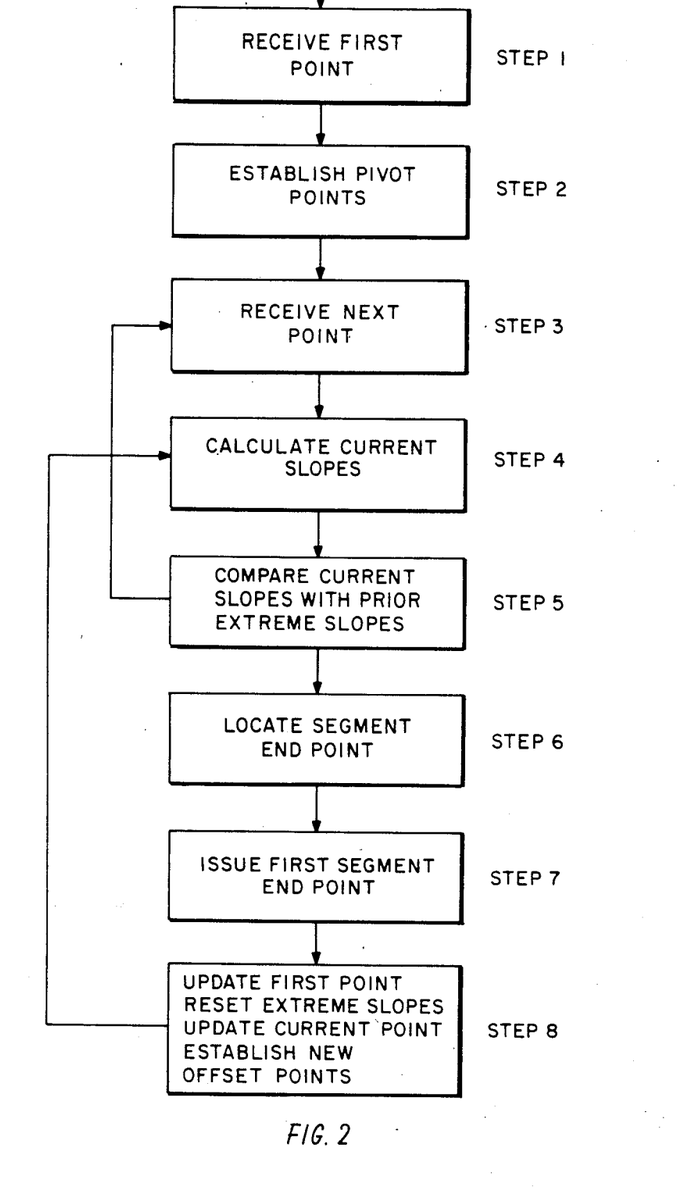
FIG. 2 is a flow chart of a preferred embodiment of the control sequence.

Turning now to FIG. 2, there is displayed a flow chart of the steps of the Swinging Door method. The method operates within the above described equipment to receive a digital data stream, compress it, and generate an output stream of compressed data and various relevant included signals. The following discussion will track the steps of the flow chart, with reference to other diagrams.

Turning now to the flow chart of FIG. 2, the Swinging Door method in conceptual summary works as follows: After initialization, the first step is to receive the signal values of a first data point. In the next step, error offset values are established above and below the first data point, from which two lines, called doors, point to each next successive point. The doors establish upper and lower boundaries that are used to contain the data within the zone between the doors. The doors each pivot about their respective offset points with each door turning in one direction only. The upper door, initially pointing straight down, turns only counterclockwise, and the lower door, initially pointing straight up, turns only clockwise. If a successive point is between the rotated doors, it is passed. If it is outside a door, that is above the upper door or below the lower door, then that door is rotated to accommodate the point. In this way the doors are progressively rotated to close upon an ever longer, and yet more narrowly directed corridor that contains the current series of points. Once the doors have rotated so as to parallel each other, they are then not allowed to rotate farther. The parallel doors, centered about a central trend line, then form a band or corridor that covers the data received to that point. As long as subsequent data falls within the boundary of the now parallel upper and lower doors it is passed over.

The end of the current corridor is signalled by the receipt of a data point outside the corridor, after the doors have become parallel. A last point positioned between the parallel doors is recorded as representing the last point along the segment. In this way only the first, and last signal points along the corridor or trend segment are recorded, and all the intermediate points are discarded. Note that all the discarded points fall within the corridor defined by the parallel doors.

The last point of the trend segment is used to established two new pivot points above and below it by the offset or error bound. New doors start again in closed position pointing to the next point. The doors swing open as before with each new point until they become parallel whereupon they lock. In this way a sequence of corridors or trend segments are formed about the input signal data points and only the end points of the corridors are issued as output signal points.

The swinging door process is then incorporated with variations and enhancements for calculations, storage, and display in electronic equipment so as to resolve the difficulties of storage and display stated earlier.

The following discussion as to the detailed implementation of a preferred embodiment is made easier with the establishment of some naming conventions. Incoming signal data points, D(i), will be referenced in alphabetic sequence (A, B, C) and also numeric sequence of their arrival (1, 2, 3). Their vertical data values will be referred to by DY, as for example DY(1), and their horizontal time values will be referred to by DX, as for example DX(1). The data points D(i) are used to generate trend lines or corridor segments for the output signal. The computed corridor or segment end points that replace the input data points D(i) so the output signal will be referred to in sequence by C(i). CX will refer to the time and CY will refer to the value. Note C(i) will not generally correspond to the data point D(i). For each corridor point C(i) there will be a pair of pivots L(i) and U(i). L will refer to the lower offset points or door pivots, LX(i), LY(i) being the time and value for the lower pivot point. U will refer to the upper offset points or door pivots, UX(i), UY(i) being the time and value for the upper pivot point. The pivots U, and L are offset by an amount E, called the error from the first point of a corridor. E is then one-half the height of the corridor. Other elements will be defined as the discussion progresses.

Figure 3:
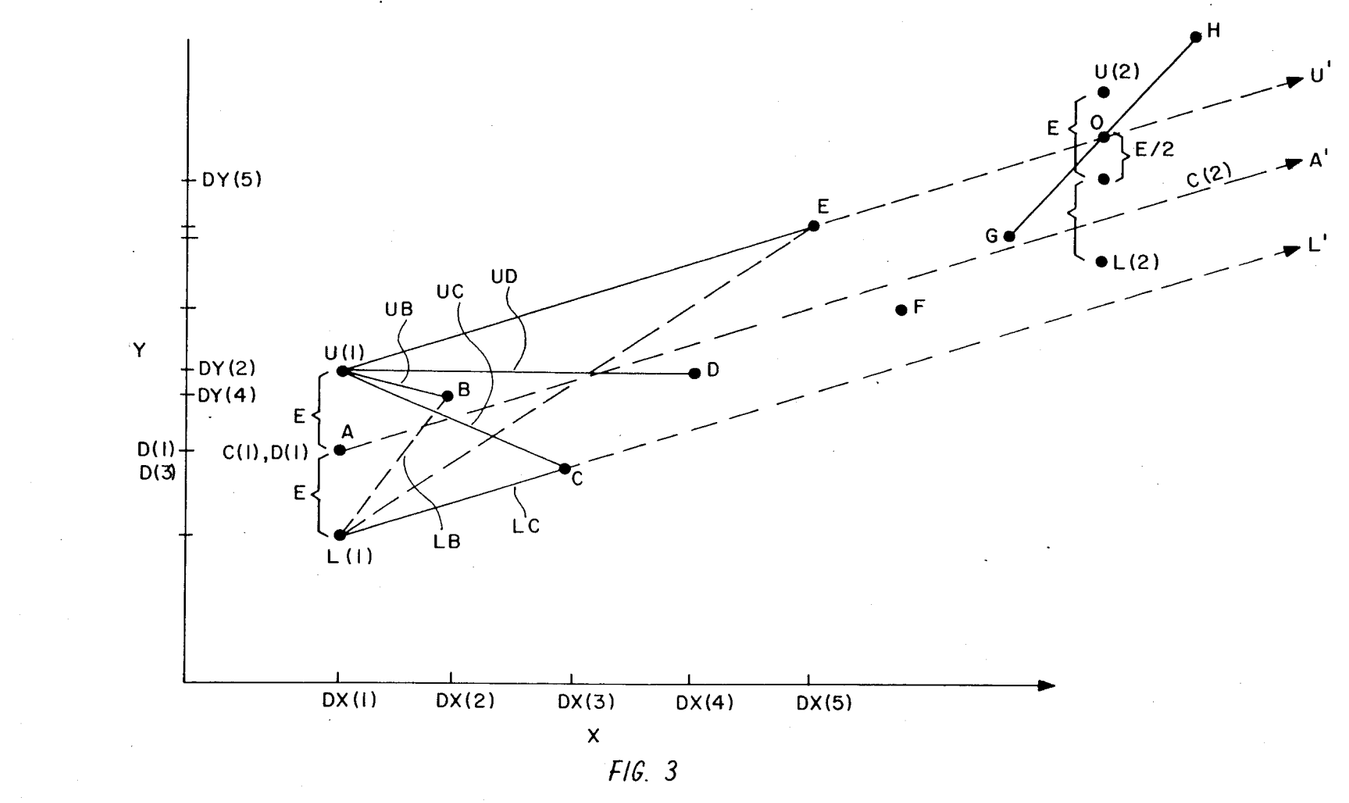
FIG. 3 is a geometric explanatory diagram using a sample stream of points.

Looking now at FIG. 3, there is an example of an analog signal that has been digitized and now is displayed as a single series of points on a graph. The vertical component is a data value, and the horizontal component is time, increasing to the right. A series of incoming data D(i) is charted by points A, B, C, D and E, with data values DY(1), DY(2), DY(3), DY(4), DY(5) at times DX(1), DX(2), DX(3), DX(4) and DX(5).

The Swinging Door method in the preferred embodiment operates as follows with steps referring to those of FIG. 2 and the sample points as displayed in FIG. 3:

For the given data stream to be compressed, a configuration record is initially recorded at the head of the data stream. The initial record includes initialization parameters including, for example, the time and value scales, the error offset E, and the step condition parameters. Such initialization is known to those skilled in the art, and is not displayed in FIG. 2.

After initialization, each successive point D(i) from the input signal is read and the stream reduced according to the Swinging Door procedure for output as the preliminary compressed data signal. The output points C(i) are then further processed as the case may be by one of the four secondary procedures. The process is displayed in the flow chart of FIG. 2. The detailed steps of a preferred embodiment will now be presented. The preferred calculations as presented may be adapted and varied according to skills in the art.

Step 1, a first data point D(1) is received having time and value of DX(1), DY(1). D(1) is shown as point A on FIG. 3. The first point is also the first corridor point CX(1), CY(1). For subsequent first corridor points, the computed corridor end point of the previous corridor is used, and a raw data point D(i) is not used.

Step 2, two pivot points, labeled L(1) and U(1), are vertically displaced from the first corridor point C(1) which is also point A, with U(1) being positively displaced from the first point C(1) or A by an error bound +E, and L(1) being negatively displaced from C(1) or A by the error −E. These are calculated as $$UY(1) = DY(1) + E$$

$$UX(1) = DX(1)$$

$$LY(1) = DY(1) - E$$

$$LX(1) = DX(1)$$

Step 3, a second data point D(2) is received. The point is labelled B in FIG. 3.

Step 4, two segments UB and LB are constructed from the upper and lower pivots U(1) and L(1) to point B. These are the swinging doors that pivot on the offset points U(1) and L(1). The slopes of the two doors are calculated. The slope of upper door (SU(1)) is $$SU(1) = \frac{DY(2) - UY(1)}{DX(2) - UX(1)} = \frac{DY(2) - CY(1) - E}{DX(2) - CX(1)}$$

The slope of the lower door (SL(1)) is $$SL(1) = \frac{DY(2) - LY(1)}{DX(2) - LX(1)} = \frac{DY(2) - CY(1) + E}{DX(2) - CX(1)}$$

Step 5, the current slopes SU(1) and SL(1) are now compared with the previous maximum SU(MAX) and minimum SL(MIN) door slopes calculated during the current corridor set of points. In the present case, processing only the second data point in the corridor; there are no prior maximum and minimum slopes. The slopes SU(1) and SL(1) are then the maximum and minimum prior slopes and they are within their own limits. The process then is to repeat from step 3.

Repeating steps 3 and 4, a third point C is received, and the slopes from the offset points U(1), and L(1) to C are calculated, call these SU(2) and SL(2).

Repeating step 5 for point C, the current upper SU(i) and lower SL(i) door slopes as exampled here by SU(2) and SL(2) are compared with the previous extreme maximum and minimum values for these values SU(MAX) and SL(MIN), exampled here by SU(1) and SL(1), and one of the following actions taken:

1. If SU(i) is greater than SU(MAX), update SU(MAX) with SU(i) and retain the values for (DY(i), DX(i)) as a maximum point Y(MAX), X(MAX).
2. If SL(i) is less than SL(MIN), update SL(MIN) with SL(i) and retain the values for (DY(i), DX(i)) as a minimum point Y(MIN), X(MIN).
3. If neither of the conditions 1. or 2. occur, then update the current last point D(i−1) that is inbounds, that is between the Swinging Doors, with the current point D(i) as the last inbounds point and repeat the process from step 3 above.
4. If SU is greater than SL, the doors are being opened wider than parallel, so additional processing occurs. First, a corridor end point C(i) is generated to represent the end of the current corridor.

In the displayed case of FIG. 3, the upper slope SU(1) of the upper door segment from U(1) to B is greater than the slope SU(2) of the segment from U(1) to C, that is the first upper door UB is more open than the second upper door UC. The upper door is then left open as defined by the first segment UB.

The lower slope SL(1) of the lower door segment LB is greater than the slope SL(2) of segment LC as displayed, that is the second lower door from L(1) to C is more open than the first lower one from L(1) to point B. In this case the lower door is opened or swung wider to accommodate point C or more technically the minimum door slope SL(MIN) is updated with SL(2). The doors are now positioned as UB for the upper door, and LC for the lower door.

The sequence of steps 3, 4, and 5 continue to be repeated. Point D is received, and in this example the upper door UD is swung open to accommodate it. The upper door is always opened with increasing slopes; while the lower door is always opened with decreasing slopes but note that for the same point the upper door slope is always less than the lower door slope, so as the doors open their slopes approach equality. Each door is opened only to the extent necessary to include all earlier points, and only until the doors form parallels. Every time one of the doors is opened either a new upper or lower extreme point has been encountered that establishes a new extreme upper or lower boundary condition. The values of these extreme points defining the maximum and minimum boundary conditions (along with the pivots and error value E) are used in further procedures discussed below.

Finally, point E is received. To open the upper door to point E would increase the upper door slope from point U to point E as wide as the widest lower door slope which as depicted runs from point L to point C. Opening the doors to the point of being parallel, sets an envelope or a corridor of the error amount E above and below the current central trend line from A, depicted as the dotted AA'. The trend line AA' has a slope ST that is less than or equal to the least lower door slope SL(MIN) and is greater than or equal to the greatest upper door slope SU(MAX). The occurrence of a point like E setting the doors exactly parallel is possible, but in actuality is a rarity and has been used here as an illustration.

Step 6, when the doors would be opened wider than parallel, an end point for the current trend sequence is calculated. More specifically, an end point condition is recognized when the extreme boundary condition for the boundary being expanded would exceed the extreme boundary condition for the opposite boundary. The end segment condition occurs when the greatest upper boundary condition would be made greater than the least lower boundary condition (lower extreme) or the least lower boundary condition would be made less than the greatest upper boundary condition (upper extreme). The displayed upper boundary UU' parallels the lower boundary LL' to show the complete corridor but in practice this will not generally be the case. A new boundary is generated by extending from the pivot of the boundary exceeded by the out of bounds point, a constructed boundary using the boundary condition (slope) of the boundary not exceeded. The constructed boundary condition equals the unexceeded boundary but pivots on the opposite pivot.

The end point C(i) of a corridor segment is computed by interpolating between the last point D(i) in bounds, and the first point, D(i+1) out of bounds to find a point crossover 0 where the segment between these two points crosses outside the corridor band intersecting the constructed boundary. A portion of the error value E is added to or subrracted from the vertical Y value of the crossover point 0, depending on whether the crossover occurs at the lower or upper boundary of the corridor. This locates the last point along the corridor trend line called the second corridor end point called the second corridor end point.

An example of this is shown where point H would cause the upper door to open wider than being parallel with the lower door, that is the slope from U to H is greater than current least lower slope SL(MIN) wnich in this case is the slope of the lower door rrom L to C or SL(2). G identifies the last point D(i) inside the bounds of the corridor defined by the parallel doors, in this case the lower door from L to C, and a door parallel to it running from U, the opposite offset point. In this case, the dotted UU' shows the upper parallel boundary.

The crossover point 0 is the intersection where the data line from the last in bounds point, point G, to the first out of bounds point, point H, crosses out of the corridor along the upper envelope boundary UU'. From this "going out" point, the trend segment or corridor end point value CY(2) is calculated as the value of crossover point 0 minus E/2, the error bound value divided by two. The corridor end point C(2) is the last point of the first trend segment or corridor. It is saved along with C(1) as representing the data points A through G. Points B, C, D, E, F and G are dropped from the data stream of the output signal.

The calculations for the preferred corridor end point using conventional geometric methods are:

1. Calculate the going out slope SO between the last inbounds point D(j) (eg. G) and the point out of bounds D(j+1) (eg. H)

$$SO = \frac{DY(j+1) - DY(j)}{DX(j+1) - DX(j)}$$

2. Calculate the time value for the crossing out point 0 (the next corridor point time)

$$CX(i+1) = \frac{UY(i) - DY(i) - SL(MIN)*(DX(i)) + SO*(CX(i))}{SO - SL(MIN)}$$

3. Calculate the value OY for the crossing out point 0

$$OY = UY(i) + SL(MIN)*(CX(i+1) - CX(i))$$

4. Calculate the new corridor point value $$CY(i+1) = OY - E/2$$

Note the calculation for the crossing out point is for a point along the upper boundary of the corridor. A similar calculation is made if the crossing is made along the lower boundary.

Step 7, Point C(1) is issued as an output point in the compressed data stream of the output signal Step 8, Point C(2) is now used as the first point of the next segment. It corresponds in function to data point A of the original segment. The maximum and minimum prior slopes SU(MAX) and SL(MIN) are reset, as no such values exist as the next corridor segment is begun. New pivots above and below C(2) by the error amount E, and shown as U(2) and L(2) in FIG. 3, are generated to be used as the pivots for the next swinging doors. They correspond in function to U(1) and L(1). New doors from L(2) and U(2) to H are calculated and the next segment of data is started by returning to Step 4.

Locating the segment end point C(2) at the crossing out point adjusted by an offset, OY−E/2 is not immediately evident. A point centered between the parallel doors along AA', and with the same time value as the crossing out point 0 is one reasonable choice for the corridor end point value CY(2) particularly if the deviations from the center line are assumed largely due to noise. Using such a center line point, along with the first point of the trend segment C(1), the trend segment from C(1) to C(2) can be said to fairly represent the trend of the first corridor from C(1) to C(2). Choosing the center line point as the segment end is increasingly more reasonable as the length of the trend preceding C(2) (eg. points A to G) increases. However, the crossing out point, 0, where the data sequence crosses out of the error envelope, can equally be said to fairly represent the initial point of the next trend segment from C(2) to C(3) especially where noise is assumed to be insignificant. Still another method is to choose the last in bounds point as the corridor end point. Processing is then quite fast, as the complex locating methods are avoided. Such a choice preserves an original data point in the output signal, but does allow the corridor direction to vary some from the parallel doors direction. Similarly, other end points can be advocated. Experience has shown that an intermediate point between the crossing out point, 0, and the center line point leads to longer trends and therefore greater compression with the same error bounds.

The intermediate point may be selected by multiplying the error E by a factor representing the length of the current trend segment normalized to range from zero to one. Similarly, more complex position adjustments may be made. A simple, fast and by experience, acceptable method, is to split the difference and use E/2 as the offset.

The trend segment end point C(2) is then chosen as the crossover point 0 offset by E/2 in a direction toward the central trend line.

The pivot points U(i), L(i) need not be vertical above and below the trend segment start C(i). One variation is to calculate the pivots as offset by the error distance E from the start C(i), but at an angle related to the prior, or next trend slope. Angling the pivot points U, and L from the corridor point C(i) fits the error corridor to the trend of the actual data sequence a little better. However, calculating complex pivot positions is time consuming. Experience shows the simple vertical offset is fast and generally adequate.

The Swinging Doors need not be swung all the way to being parallel before a corridor end point is calculated. Numerous strategies for weighting door slopes with corridor length exist; however, the parallel strategy is simple and efficient. The result of the Swinging Door process is then a series of points C(i) being the corridor segment end points. All intermediate points D(i) have been dropped reducing the data stream according to the error width E.

The important features of the door or boundary definitions are that the upper boundary condition for each point be less than the lower boundary condition for the same point, and that sucessive upper boundaries, and successive lower boundaries include all the previous points between the first and current point. These conditions let the boundaries be fitted dynamically by successive points to a strong trend line. These boundary conditions are displayed by the simple swinging door/slope calculation described. Other boundary calculations could be used with curved boundaries. Other features of the process of narrowing the two boundaries by successive adjustments so as to approach a strong trendline may also be made. The swinging door method is preferred as the processing is simple and direct.

The calculation time for the swinging door compression becomes less significant as the rate of data compression increases; that is, the number of points within the error bounds of a segment gets large. The processing time for the calculation is similar to other compression procedures. The critical parts of the calculations for the process are the two divisions used to calculate slope. At 100 microseconds for a division with an 8-bit microprocessor it takes an average of 300 microseconds for each run through the calculation. Thus, if the calculation is performed once each second, a typical microprocessor provides far more power than needed for one data stream. One processor could theoretically then handle 3000 data streams at one second per sample. Timing and internal program management requirements in fact reduce this theoretical ability. No tests have been executed as to the maximum number of data streams that might be compressed at one time.

Current control systems sample process data about every tenth of a second which is a rate much faster than necessary for meaningful recording. If tenth of a second samples are averaged together into one second samples, then the digital values used in processing can represent a time scale in seconds. A time value stored in an eight bit word then has a maximum value of 255 seconds or four minutes; in a 16 bit word, 65535 seconds, or 1098 minutes, or 18 hours; in a 24 bit word, 281344 minutes, or 4689 hours, or 195 days; in a 32 bit word, 1100384 hours, 45849 days, or 126 years.

With respect to the range of accuracy, that is, resolution of full scale, eight bits (255 maximum value) is adequate representation for most analog values providing better than ½ percent (1/255) accuracy, but if it is desired to represent the data in natural units one may go to a 16 bit representation or a more complex floating point format.

The utility of the Swinging Door method is further enhanced when used in conjunction with several subsequent secondary procedures. The Swinging Door procedure establishes strong trends. Where the data is known to have trend characteristics such as steps, ramps, waves, or similar known forms; such forms can be tested for and the data further reduced accordingly. However, without strong trends such as those provided by swinging door compression, the trends are noisy or irregular and complex data forms are difficult to identify. Every data point must be tested for compliance with the form definition when most likely the data point is a continuation of the previous value with some minor variation due to measuring or transmission effects. The data is then thrashed for little productive result. The Swinging Door trends make subsequent form searching possible.

The processing of the subsequent procedures, or modes, may be viewed as taking the most current corridor end point $C(i)$, and a set of the immediate past corridor points ($C(i-1)$, ($C(i-2)$ or more) and any mode code characterizing the previous data and testing for one or more specific patterns among the corridor points $C(i)$. If a complex pattern is identified, then the pattern is noted with a mode code and the $C(i)$'s can be encoded in an even more compact manner; according to the pattern or mode recognized.

The number of corridor points $C(i)$ that are held temporarily while tests for the more complex patterns is performed, depends on the complexity of the pattern sought. For a step pattern where an abrupt shift is made from one level run to a second level run, three corridor points are needed. For a step well where an abrupt shift is made to one level and then back to another level, four points are needed. The processing alters the corridor point stream $C(i)$ either by changing entries in the final memory or values in a buffer of the most recent points before transmitting them. For efficiency, the procedure inserts one mode change code into the output stream for each new complex pattern identified. A mode flag heads the sequence of consecutive segments recorded under that mode. The system must remember the last mode change to accommodate transition from one pattern to another. Where more complex modes require a succession of normally compressed points before the second stage of compression can be carried out, points are speculatively output with a normal mode code. Thus, some data is recorded under a transitional mode as a leader or trailer to the complex modes. The system remembers the prior mode code and the number of corridor points $C(i)$ so that it can reexamine them to see if (1) the prior mode still applies and if so to replace the relevant $C(i)$ and the temporary mode code with further compressed data, or (2) continue the normal compression process.

The following four special procedures assume that a normal Swinging Door compression is progressing, and is generating a series of corridor points $C(i)$, which are to be searched for additional patterns. The data for the last segment end point has not been stored and is available for further processing. In other words, $C(i)$ is held until $C(i+1)$ computed whereupon $C(i)$ is stored and $C(i+1)$ is held until $C(i+2)$ is computed.

With several modes of compression being generated, flags or mode codes must be placed in the output data to signal the mode of the data that follows. The preferred format for such flags is to assign the highest digital values one each to the compression forms. The occurrence of one of these reserved values then signals the nature of the data to follow and is not used to represent a real data value. For example, with 8-bit words, 252, 253, 254 and 255 are reserved as the four mode flags for the four compression forms presented below.

With 252 assigned to the fixed error envelope compression, the occurrence of 252 in the data stream signals the standard Swinging Door compression mode as discussed above. Next follows pairs of data words, one being the data value and the other being the time value. These pairs represent the segment or corridor end points $C(i)$.

What has been described above is called a "compression to a fixed error"; that is, the error envelope or corridor is fixed for all segments of the data. A modification is to compress to a fixed rate of compression, that is, to yield a fixed number of points per time unit. Compression to a fixed rate requires dynamically changing the error value in the above fixed error method and so is also called variable error compression. When the output data flow $C(i)$, as points per unit time, exceeds a certain rate, the error bound or corridor width is expanded allowing more data points $D(i)$ to fall in the error envelope before a point outside the corridor is encountered causing a new segment to be calculated. Oppositely, reducing the error value, narrows the error envelope and will increase the number of points $C(i)$ per unit time.

Varying the error value E is useful when the storage available, and the time until storage will be renewed are known. For example, local storage of 16 kilobytes might be needed to cover one hour's recording until there is a transfer to for example another computer's (46 of FIG. 1) central memory. Allocating the memory over the hour allows initially about four points a second to be recorded. If the device is quiescent for half an hour, or changing at a fixed rate, a stable trend line adequately preserves the data with one start and one end point. Storing only the two end points for the quiescent period leaves 16 kilobytes minus 2 data points to record the next half hour.

Reallocating the remaining memory over the remaining time now allows nearly 8 points a second to cover the remaining half hour. If the second half hour becomes very active, requiring recording at say 20 points a second, it is evident storage will be exhausted before the full hour is up. The error bound is then expanded, so as to continue recording at the permissible 8 points a second thus assuring coverage over the whole hour. Note that no period goes unrecorded, and the active period receives better coverage at 8 points a second than a fixed recording rate of 4 points a second would have given. In this way memory use is adjusted to balance need to record versus available storage. A preferred mechanism for such compression is as follows:

If the time interval between the one corridor end point $C(i+1)$ and the previous corridor point $C(i)$ is less than a minimum recording rate TR(MIN), then the recording rate is too high. The error bound E is increased to a new value E' so that instead of the doors diverging (US is greater than LS) for a data point D(i) outside the current corridor, the pivots U(i), L(i) are adjusted so the doors are parallel and include the point D(i). The process delays recording the segment end point $C(i+1)$ until sufficient time has passed to assure the proper recording rate. The compression calculation continues using the enlarged error value E'. To expand the error envelope, new pivots U'(i), L'(i) must be created. Also it is desirable to seek the least error value that will include the relevant points and in particular the points that determined the maximum D(MAX) and the minimum D(MIN) door positions. By retaining the data and time values for the points that last opened the door positions (X(MAX) Y(MAX), and X(MIN) Y(MIN)), a calculation can be made wherein the least expanded error E' is found that repositions the pivots U'(i) and L'(i) with the swinging doors and all maximum and minimum points within the area bounded by the doors. Actually, the current out of bounds point now becomes either the upper or lower maximum point depending on whether it has exceeded the upper or lower boundary.

The preferred calculations for computing the new error E' and the corresponding new shared value of the slopes LS and US are:

$$SU(MAX) = SL(MIN) = S = \frac{(Y(MIN) + Y(MAX) - 2*CY(i))}{(X(MIN) + X(MAX) - 2*CX(i))}$$

and $$E' = \frac{abs((Y(MAX) - Y(MIN)) - S*(X(MAX) - (MIN)))}{2}$$

where
SU(MAX)=the recalculated maximum upper slope after the calculation.
SL(MIN)=the recalculated minimum lower slope after the calculation.
Y(MIN)=value of the point defining the minimum lower door after the most recent corridor point.
Y(MAX)=value of the point defining the maximum upper door after the most recent corridor point.
X(MIN)=time of the point defining the minimum lower door after the most recent corridor point.
X(MAX)=time of the point defining the maximum upper door after the most recent corridor point.

The calculation adjusts the pivot points from $CY(i)\pm E$ to $CY(i)\pm E'$ so that the upper and lower doors are parallel, and pass through the two encountered upper and lower points Y(MAX), X(MAX), Y(MIN), X(MIN) that are farthest from the current trend line. Other possible error adjustments are to increase E by a fixed factor, by a time related factor or other means.

With 253 assigned to the variable error compression, the signal word 253 is followed by data pairs, one of which would be the data value, one the associated time value, and the third being the error bound used for that segment. Alternatively, the time and magnitude of a data point that maximally sets the error bound may be stored. The error value may then be calculated, while a real data point is preserved in the data stream. Note that the inclusion of the actual point allows a subsequent second compression to be made using the real point, and not the pivot points as the maximum limit.

Except for the new error bound E' replacing the original error bound E in all calculations for the upper and lower offset or pivot points $(UY(i)=CY(i)+E'$, $LY(i)=CY(i)-E')$, the slope and other calculations are unchanged. Computationally, the compression rate test is added to the calculation every time the bound (E or E') is exceeded. Experiment shows that making the calculation can actually save time as against recording an additional segment end point C(i). The error expansion calculation is faster than frequent use of the more complex interpolation calculation.

Compression to steps is another compression method that can follow Swinging Door compression. It is useful where the data source is known to operate in steps, for instance where the data is a response to periodic set point changes.

Figure 4:
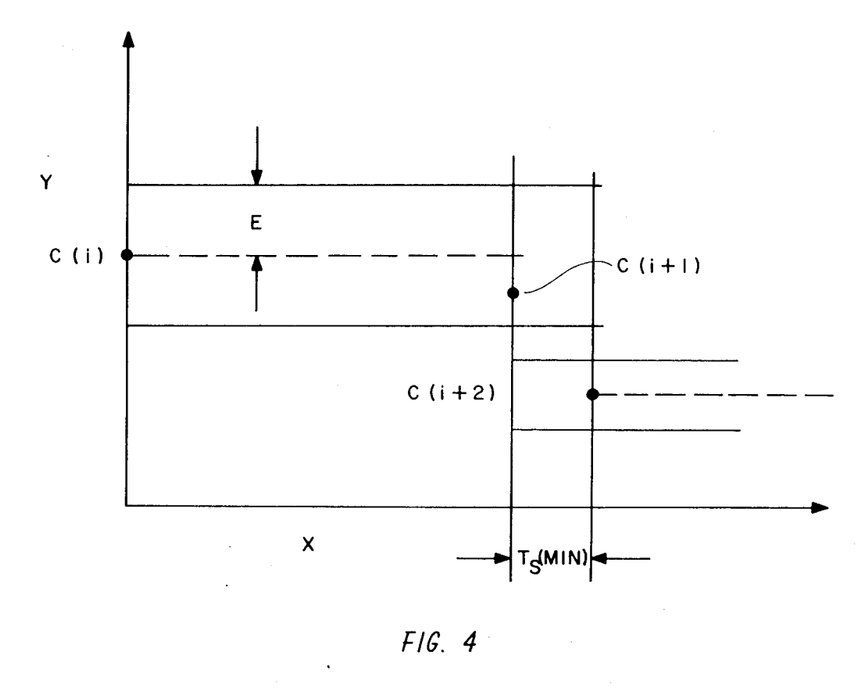
FIG. 4 is a geometric explanatory diagram of a step stream of points.

Looking now at FIG. 4, the method in general is to establish a criteria for being on a first step, and then recognize the occurrence of a new second step. The preferred calculation for being on a first step is when the absolute difference between the value of the first point of the current segment CY(i), and last the point of the current segment, $CY(i+1)$ is less than the error bound value E times an appropriate factor, for example 1.1 and when the time difference between CX(i) and $CX(i+1)$ is at least greater than some minimum time a step TS(MIN). This means the current trend is essentially level for a significant interval.

If the difference between the last segment point CY-$(i+1)$ and the current point $CY(i+2)$ exceeds the error bound by E times the 1.1, that is the current point is not on the level step; and the time difference between $CX(i+1)$ and $CX(i+2)$ is less than some minimum time for a step TS(MIN), that is the transition from the level is rapid; then a step change is signalled. The point $C(i+1)$ can be eliminated being replaced when needed by a reconstructed point defined as the value of the first level, CY(i), but with the time $CX(i+1)$. The first point of the next step is $C(i+2)$ with the value of $CY(i+2)$ and time of $CX(i+2)$. In this way, the points C(i) and $C(i+2)$ are retained, and when necessary the step pattern allows the reconstruction of the intermediate point $C(i+1)$ where $CY(i+1)=CY(i)$ and $CX(i+1)=CX-(i+2)$. In fact only point C(i) and $C(i+2)$ are issued as output along with a mode code.

With 254 being the step data signal, a 254 is followed by word pairs of the stepped data. The data would represent the level of the data and the time at which the step started. The level is constant until the the next data pair occurs whereupon the value steps to a new level.

In addition to the special pattern searches, it may also be useful to record the data directly, taking advantage of the current data flow and memory status. Briefly, if the data D(i) is flowing at an acceptable rate but is rapidly changing directions, it is more efficient to record the data D(i) directly and not to calculate trends. An arbitrary number of points, N, are stored directly, and the storage rate is then retested to see if another block of N points should be stored or whether trend calculations should be reverted to. Storing the D(i) without calculating the C(i) is referred to as a direct or transparent storage, and the mode code 255 is used to signal it.

The test for using direct storage is whether the number of recorded data samples C(i) is nearly equal to the number of time samples D(i). When nearly every sample time D(i) yields a recording C(i), it is more efficient to store the value DY(i) and drop the time stamp DX(i) which may be reconstructed later from the start time and the running rate. When data is stored directly, a mode flag is placed in the output data stream, and a group of N data values DY(i) is stored. Note that the time stamp is dropped from the data stream thereby reducing the memory required. After the group of N is stored, the data is again tested to see if recording blocks of data is the efficient mode. The output data sequence is then a 255 mode flag followed by a sequence of data valves DY(i). The time interval is a known constant depending on the rate of the analog to digital converter, and so the time stamps may be recreated.

The preferred combination is to first test whether the data is being sufficiently compressed. If the time difference $CX(i+1)-CX(i)$ is less than a minimum TR(MIN), then there is insufficient data compression as points are being recorded more frequently than memory will tolerate. The procedure is to expand the error corridor by resetting the error E as described above. If the data compression is sufficient, then test whether it would be efficient to store the data directly by comparing a current count of received signal values versus a current count of issued signal values. If the issue rate is less than half the received rate, then it is more efficient to drop the time stamp from the issued signal and issue the received value directly.

Other mode codes may be added to signal other processing or data modifications. In particular codes for initialization, suspension of operation, scaling, reinitialization and similar events may be added.

The process of data compression normally continues without end, as the typical data source, a flow sensor, operates continuously. Where the compression parameters are changed, or where the output stream switches from one source to another, these changes are flagged in the output.

For example, where one data compression unit is reading ten source devices, the data streams D(i) of all ten units would be stored locally in blocks of data. Periodically, the storeage block for each stream is processed into corridor points C(i). A header block having a stream label and other data is issued, and the processed corridor points C(i) are issued. The local memory for the processed stream is purged of the old data, for example by updating a memory pointer allowing new data points D(i) to be read in over the old values. The next stream is processed in a similar fashion. The one data compression device thus uses one memory, and one processor to reduce numerous data streams.

The compressed data stream is displayable in two convenient forms. The first is to draw the sequence of data points as a line graph. The second mode is to draw the sequence of points as a line graph with accompanying error bounds.

The error bounds parallel the central line graph but are offset by the error amounts. Note that for fixed error bounds this plot results in a fixed vertical width swath across the display.

When the variable error mode has been employed, the central data line is bracketed with error bounds that vary in distance above and below the trend line. Where the error bounds are wide, it indicates the data was highly variable, and where the bounds are narrow, it indicates the data was fairly constant.

Line display of uncompressed or transparent compressed data requires the addition of time signals. The time spacing for the uncompressed data was assumed to be a constant rate when the data was recorded, so the assumed time spacing must be reapplied for display. When the uncompressed data flag, is encountered during display, it is skipped over, and the subsequent data is displayed at intervals depending on the assumed input time interval. The data is read and displayed at intervals until a different flag is received.

The beginning of stepped data is signalled by its flag, 254. The steps are described by data pairs being the starting value and time for CY(i). The next pair describes the next starting value and its time for CY(i). It is incorrect to draw directly from the first to the second point, as this would display a slope and not a step. An intermediate point having the value of the prior CY(i) and the time of the next data pair $CX(i+2)$ must be inserted so that there is a horizontal line from C(i) to $C(i+1)$, followed by a vertical step from $C(i+1)$ to $C(i+2)$.

In a similar fashion where a complex pattern in the original data has been compressed to a few key values, the whole structure must be reconstructed during display.

The variable error displays require more processing to add the boundary displays to the central trend line. For the uncompressed data, there is no error bound and so its display is exactly as for line display.

The fixed error compressed data is read as before. The upper and lower error bounds are computed by respectively adding and subtracting the error from each data value and drawing interconnecting segments, between upper offset points U(i), and likewise, connecting the lower offset group L(i).

The variable error data is displayed in the same manner as the fixed error data; however, the offset amounts change with each segment. An end point is received in its data triplet and the upper and lower offset points are computed. The next data point is read and the upper and lower offset points are computed using the previous error value. The upper and lower error bound lines are then drawn from the first and second offset points. The error for the second point is then used to compute a second set of offset points for that second point. These are connected to similar offset points computed for the third point. In this way, each segment end point has four offset points, two upper, two lower, if the error value is changed with each segment.

The error display for step data is the same as for fixed error bound data with the proviso that the step point is added as described for linear display of step data. This displays a fixed width swath of steps.

The system can be extended to recompress previously compressed data. In this case, missing points such as the inferred step position must be reconstructed and added to the data stream. The previously compressed data has an error bound and must be accounted for by either replacing each point by offset error points, or by directly accounting for the error in the subsequent compression calculation. Multiple compressions may be performed on the data depending on subsequent storage limitations. Where only the corridor end points are kept, the maximum and minimum points along the corridor must be as supplied to be at the pivot points above and below the corridor end points. Where the actual maximum and or minimum points (X(MAX), Y(MAX) and X(MIN), Y(MIN)) are retained in the output stream, subsequent compressions can be more accurate going around these points instead of around the pivot points. Likewise display can show the actual maximum and minimum points. Note that the variable error E may be calculated from the corridor end points and one of the maximum points. It is then a matter of choice as to whether one or two real maximum points are retained or whether a variable E is retained.

Although the present invention has been described in terms of a preferred microprocessor embodiment as shown in the accompanying figures, certain modification and changes may become apparent to those skilled in the art. For example, the pivot points may be offset from the trend line differently and the positioning of the corridor end points may be made differently.

The invention in one preferred implementation is a microprocessor based data collecter allowing the short-term accumulation of a history of one or more data streams. The process canld also be implemented as a large central computer as a data historian designed to accumulate, display, manipulate, and archive entire plant histories for plant operation, further incorporating any needed post-operations analysis. In the former case the practical design includes control and monitoring functions related to the compression processing of the data. The latter case requires mass memory devices for archival functions.

The ability of preliminary filtering and averaging and subsequent procedures utilizing the output developed by the method has been indicated and it is expected that such preprocessing and post processing will be joined to the present method in actual use. Nevertheless, it is intended that such modifications be encompassed within the scope of the following claims.

I claim:

1. A data compressing device for compressing an input data stream comprising:
    (A) means for providing an input signal to be compressed having in sequence data points of vertical Y values and horizontal X values;
    B) memory means linked to the providing means for retaining at least temporarily the vertical Y values and horizontal X values of each data point;
    C) boundary generating logic linked to the providing means and the memory for generating a current upper boundary condition between (1) an upper pivot point positively offset in the vertical Y direction from a first data point serving as a first corridor end point and (2) each subsequent current data point and for generating a current lower boundary condition between (1) a lower pivot point negatively offset in the vertical Y direction from the first corridor end point and (2) subsequent current data point, wherein the lower boundary condition for a data point is greater than the upper boundary condition for the same data point;
    (D) electronic comparing logic for comparing each upper boundary condition subsequent to the first corridor end point and retaining a maximum upper boundary condition;
    (E) electronic comparing logic for comparing each lower boundary condition subsequent to the first corridor end point and retaining a minimum lower boundary condition;
    (F) electronic logic for recognizing a data point as an out of bounds point and causing a segment end condition when the current upper boundary condition is greater than a minimum lower boundary condition;
    (G) electronic logic for recognizing a data point as an out of bounds point and causing a segment end condition when the current lower boundary condition is less than the maximum upper boundary condition;
    (H) electronic logic for generating a second corridor end point upon the recognition of the segment end condition;
    (I) electronic logic and means for issuing the first corridor end point to a receiving device after the generation of a second corridor end point; and
    (J) means for substituting the second corridor end point for the first corridor end point in the memory and for resetting the maximum upper boundary condition to a low state and the minimum lower boundary condition to a high state.

2. The data compressing device of claim 1 wherein the means for providing an input data stream includes,
    (A) means for receiving an input signal of vertical Y values,
    (B) a clock means for generating a horizontal X value for each vertical Y signal value received.

3. The data compressing device of claim 1, wherein the upper and lower boundary conditions are the linear slopes of upper and lower segments from the upper and lower pivots to the current data point with slope being the ratio of the difference between the Y vertical value of the current point and the Y vertical value of the pivot to the difference between the X horizontal value of the current point and the X horizontal value of the pivot.

4. The data compressing device of claim 1, wherein the logic for generating a second end point, locates the second corridor end point having a horizontal X value between that of the out of bounds point causing the second end point generation, and the previous data point.

5. The data compressing device of claim 4, wherein the second corridor end point has a horizontal X value the same as that of a point of intersection between a line segment from the of out bounds point and the previous in bounds point and a constructed boundary extending from the pivot point being the first point of the boundary exceeded by the out of bounds point and said boundary paralleling the boundary farthest from the out of bounds point.

6. The data compressing device of claim 4, wherein the logic for generating a second corridor end point, locates the second corridor end point having a vertical Y value less than the Y value of a maximum upper in bounds point, and greater than the Y value of a minimum lower in bounds point for the horizontal X value of the chosen second corridor end point.

7. The data compressing device of claim 6, wherein the second corridor end point has a vertical Y value located half way between the maximum upper bound point and the minimum lower bound point of the horizontal X value of the chosen second corridor end point.

8. The data compressing device of claim 6, wherein the second corridor end point has a vertical Y value in bounds by a fixed amount from the constructed boundary.

9. The data compressing device of claim 4, wherein the second corridor end point is the previous data point.

10. The data compressing device of claim 1, wherein the upper pivot is located vertical in the Y direction above the first corridor end point by a fixed error amount E.

11. The data compressing device of claim 1, wherein the lower pivot is located vertically in the Y direction below the first corridor end point by a fixed amount E.

12. A method for compressing a two component data signal comprising the steps of:
  (A) receiving a first data point from the data signal to be the first corridor end point;
  (B) generating from the first corridor point an upper offset point and a lower offset point;
  (C) receiving a next current data point from the data signal;
  (D) generating from the current data point and the upper offset point, a current upper boundary condition and from the current data point and the lower offset point a current lower boundary condition wherein the lower boundary condition for a data point is greater than the upper boundary condition for the same data point;
  (E) comparing each upper boundary condition subsequent to the first corridor end point and retaining the maximum upper boundary condition;
  (F) comparing each lower boundary condition subsequent to the first corridor end point and retaining the minimum lower boundary condition;
  (G) recognizing a data point as an out of bounds point and causing a segment end condition when the current upper boundary condition is greater than the minimum lower boundary condition;
  (H) recognizing a data point as an out of bounds point and causing a segment end condition when the current lower boundary condition is less than the maximum upper boundary condition;
  (I) repeating from step (C) if a segment end condition is not recognized;
  (J) generating a next corridor end point if a segment end condition is recognized;
  (K) issuing the first corridor end point as output signal;
  (L) substituting the second corridor end point for the first corridor end point in the memory;
  (M) generating from the new first corridor point an upper offset point and a lower offset point; and
  (N) resetting the maximum upper boundary condition to a low state and the minimum lower boundary condition to a high state, and
  (O) repeating from step (D) above.

13. The method of claim 12, wherein the upper offset point is generated as the value of the first corridor point plus an offset error amount E.

14. The method of claim 12, wherein the upper boundary is a linear boundary connecting the upper offset point, and the current data point.

15. The method of claim 12, wherein the next corridor end point has a horizontal X value between that of the out of bounds point causing the second end point generation, and the previous data point.

16. The method of claim 12, wherein the next corridor end point is generated as a point lying between the upper boundary and the lower boundary.

17. The method of claim 12, wherein the next corridor end point has a horizontal X value the same as that of the intersection point between a constructed boundary extending from the pivot point being the first point of the boundary exceeded by the out of bounds point and said boundary paralleling the boundary farthest from the out of bounds point and the segment joining the last inbounds point, and the out of bounds point.

18. The method of claim 16, wherein the next corridor end point has a vertical value equal to that of the intersection point offset by a factor in the direction of a centerline.

19. The method of claim 12, wherein the step of generating a next corridor end point includes the steps of:
  (J1) Generating a going out slope between the last inbounds point and the out of bounds point as the difference between the Y value of the out of bounds point and the Y value of the previous in bounds point, divided by the difference between the X value of the out of bounds point and the X value of the last in bounds point,
  (J2) Generating the horizontal X value for the crossing out point as the Y value of the pivot minus the Y value of the last in bounds point minus the product of the slope of the constructed boundary and the X value of the last in bounds point plus the product of the going out slope and the X value of the first corridor end point, all divided by the difference between the going out slope and the slope of the constructed boundary,
  (J3) Generating the vertical value for the crossing out point as the sum of the vertical Y value of the pivot and the product of the slope of the constructed boundary and the difference between the X values of the second corridor end point and the first corridor end point, and
  (J4) Generating the vertical value of the new corridor end point as the Y value of the crossing out point offset by one half of the error in the direction from the constructed boundary to the opposite boundary.

20. The method of claim 12, further including after step (I) the steps of:
  (I2) generating a current rate of compression,
  (I3) establishing an expansion condition when the current rate of compression is less than a minimum compression rate,
  (I4) expanding the error value when the expansion condition is established,
  (I5) issuing a flag in the output signal denoting a change in the error value, when the expansion condition is established and
  (I6) repeating from step B when the expansion condition is established.

21. The method of claim 20, wherein the error value E is expanded to be the absolute value of the difference between the Y value of the point defining the extreme upper boundary, and the Y value of the point defining the extreme lower boundary minus the product of the difference between the X value of the point defining the extreme upper boundary and the X value of the point defining the extreme lower boundary and quotient of the sum of the Y value of the upper extreme point, and the Y value of the lower extreme point minus twice the Y value of the first corridor point and the sum of the X value of the upper extreme point and the X value of lower extreme point minus twice the X value of the first corridor end point all divided by two.

22. The method of claim 12, further including after step (K) the steps of
- (K1) generating a rate of compression,
- (K2) passing to step (L) if the rate of compression is greater than a minimum rate,
- (K3) issuing a first flag signal in the output signal denoting a mode of direct transmission of data if the rate of compression is not greater than the fixed rate,
- (K4) receiving from the input and issuing uncompressed to the output a group of points, and
- (K5) issuing a second flag signal in the output stream denoting a mode of normally compressed data.

23. The method of claim 12, further including after step (K) the steps of
- (K1) testing the output corridor points for conditions of a recognized pattern,
- (K2) passing to step (L) if no pattern is recognized,
- (K3) issuing a signal flag in the output signal corresponding to the pattern if a pattern is recognized, and
- (K4) issuing signal values determining the pattern.

24. The method of claim 23, wherein the pattern tested is a step pattern, and the signal values issued include a first Y value of a substantially level signal, and an X time transition value for a substantially rapid change in signal value.

* * * * *